United States Patent Office 3,809,608
Patented May 7, 1974

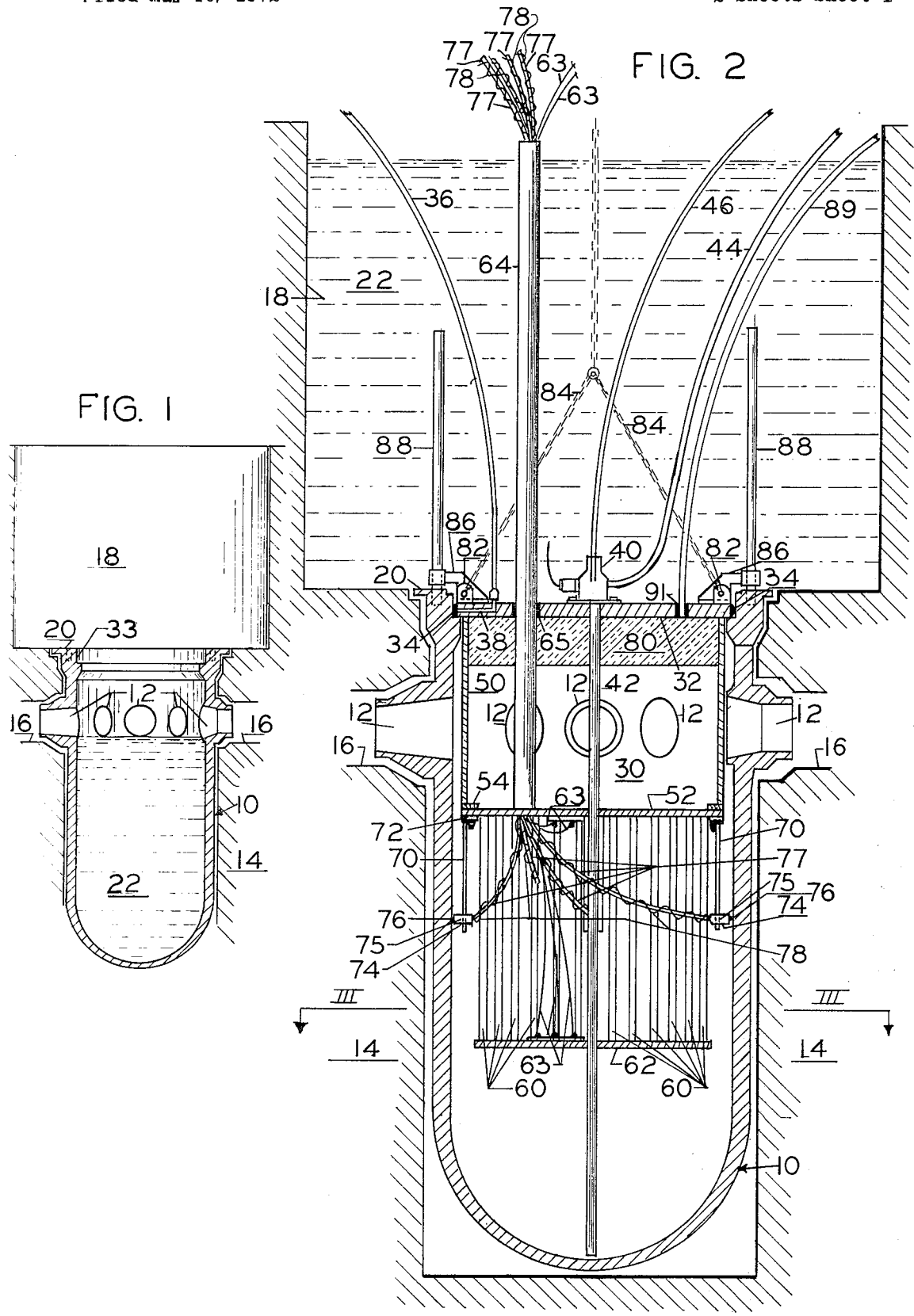

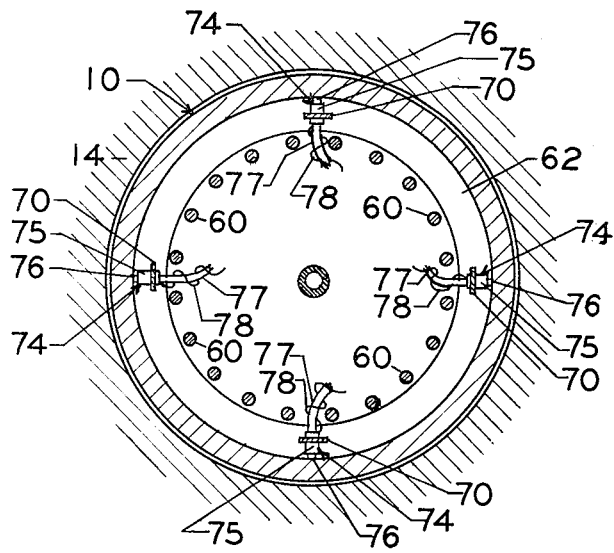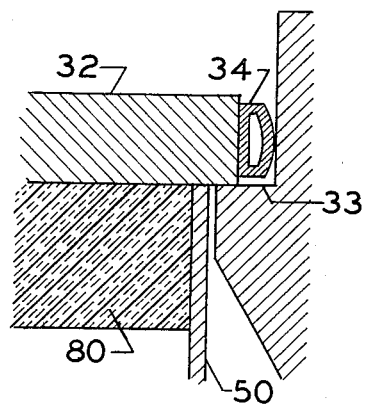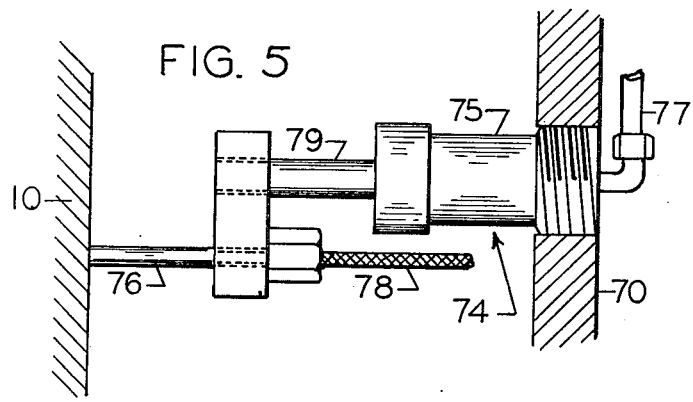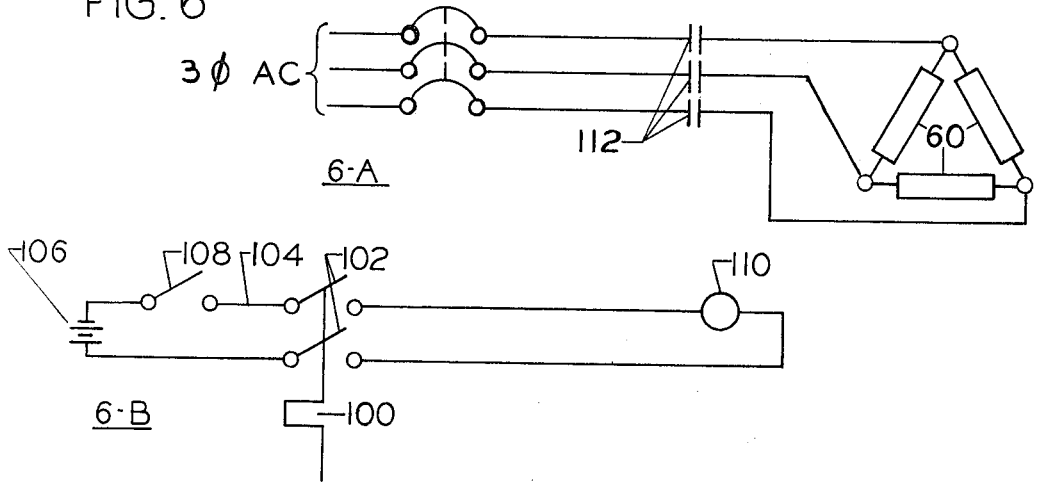

3,809,608
REACTOR VESSEL ANNEALING APPARATUS
Leonard R. Katz and Edgar I. Landerman, Pittsburgh, and Walter E. Desmarchais, Monroeville, Pa., assignors to Westinghouse Electric Corporation, Pittsburgh, Pa.
Filed May 10, 1972, Ser. No. 251,962
Int. Cl. G21c *13/00, 17/00*
U.S. Cl. 176—87
12 Claims

ABSTRACT OF THE DISCLOSURE

An annealing apparatus for use with an operational nuclear reactor vessel is disclosed. The apparatus is used for annealing a reactor vessel with the reactor internals, core and the primary system water removed from the vessel. The apparatus includes a support plate sized to be snugly received in the upper section of the vessel, with a seal ring being provided on the plate for forming a water tight seal in the space between the plate and the vessel. Heating means such as elongated resistance heating rods are supported by the plate and are disposed in the vessel in a heat transfer relationship with the section of the vessel immediately adjacent to the reactor core. A pump is supported on the plate for pumping the water out of the vessel after the annealing apparatus is placed in position within the vessel. The disclosed apparatus also includes reflective heat insulation means secured to the lower surface of the support plate; pressure equalizing tubing for effecting atmospheric pressure within the vessel during operation of the annealing apparatus; means arranged between the support plate and vessel for guiding the apparatus into and out of the vessel; and extendible and retractible temperature sensors arranged to contact the vessel wall during the annealing operation.

BACKGROUND OF THE INVENTION

Field of the invention

This invention relates to an annealing apparatus and particularly to an annealing apparatus for use with an operational nuclear reactor. That is, the present invention is constructed for in-service annealing of the reactor core region of a nuclear reactor vessel with the reactor internals, core, and the primary system water removed from the vessel.

State of the prior art

In pressurized water-moderated and boiling water nuclear reactors, both of which are used for producing steam to drive a steam turbine, a metal reactor core and other control apparatus commonly referred to as reactor internals are disposed in a metal vessel filled with water. Fission takes place within the reactor core whereby the energy of the fission products is transmitted to the water. In the pressurized water-moderated reactors the heated water is pumped from the reactor vessel through a heat exchanger in which it transfers its heat energy to another circuit of water to form steam to drive a turbine. In the boiling water reactor the energy of the fission products is transmitted to the water in the reactor vessel to form steam to drive a turbine. In both types of reactor it has been found that neutron flux imposed on the vessel wall from the reactor core results in the material of the wall having reduced fracture toughness which ultimately could result in fracturing of the wall should the condition be allowed to continue. As a result of the concern for this reduction to very low levels of fracture toughness of the reactor vessels, plans have been formulated to do an in-service annealing of reactor vessels after certain periods of operation. These plans require that the reactor vessel wall opposite to the reactor core be periodically annealed to partially restore the original fracture toughness of the vessel material in order to extend the useful life of the vessel as well as to insure against fracture resulting from reduced fracture toughness.

In order to satisfactorily anneal the reactor vessel wall, the wall must be heated for a long period of time at a high temperature. For example, a typical steel reactor vessel would have to be heated at approximately 750° F. maximum for around 168 hours. In addition, in the case of a pressurized water-moderated reactor, it is necessary that the vessel be annealed under refueling conditions, that is with the reactor internals, core, and primary system water removed from the vessel and the refueling water at maximum level in the refueling canal. It is also required that the temperatures at which the annealing operation is conducted be carefully controlled so as to prevent excessive heating of the vessel material, insulation, and primary shield concrete. Finally, it is required that the annealing apparatus be so designed as to prevent mechanical damage to the reactor vessel when placing or removing the apparatus in or out of the vessel.

One proposed solution for annealing reactor vessels of the pressurized water-moderated type while meeting the above noted requirements was to raise the primary system water to the required annealing temperature and to circulate the water through the vessel. This proposed solution is impracticable since it requires that all of the primary system components be exposed to full system pressure at temperatures which exceed the design temperature assigned to each component.

SUMMARY OF THE INVENTION

Our present invention provides an apparatus for in-service annealing of reactor vessels, which apparatus meets the requirements noted above and does not require that the primary system components be heated in excess of their design temperatures. More particularly we provide an annealing apparatus for use with an operational reactor vessel arranged in a primary shield concrete annulus, with the reactor internals, core, and primary system water removed and refueling water remaining in the refueling canal, the annealing apparatus preferably comprising: support means, such as a plate, sized to be snugly received in the upper section of the reactor vessel; heating means supported by the support means and arranged to be disposed in the vessel in a heat transfer relationship with the section of the vessel immediately adjacent to the reactor core for selectively and controllably supplying annealing heat energy to that section of the vessel; and pump means supported on the support means for pumping the water out of the vessel to a reservoir after the annealing apparatus is placed in position within the vessel. In the preferred form of the invention, there is provided extendible and retractible temperature sensing means arranged at an intermediate position with respect to the heating means, whereby the sensing elements may be retracted when the annealing apparatus is being placed within or removed from the vessel and may be extended to engage the wall of the vessel when the apparatus is in place. It is also desirable to have sealing means such as an inflatable seal ring arranged around the edge of the support plate for effecting a water-tight seal in the space between the support plate and the vessel wall. The preferred form of the apparatus is further provided with the following features: reflective heat insulation means secured to the lower surface of the support plate; pressure equalizing means, such as a length of tubing, mounted on the support plate for effecting generally atmospheric pressure conditions within the vessel during operation of the annealing apparatus; and guide means arranged between the vessel and the support plate for guiding the annealing apparatus into and out of the vessel.

Other details and advantages of this invention will become apparent as the following description of a present preferred embodiment thereof proceeds.

BRIEF DESCRIPTION OF THE DRAWINGS

In the accompanying drawings we have shown a present preferred embodiment of this invention in which:

FIG. 1 is a sectional elevation view of a nuclear reactor vessel for use in a pressurized water-moderated system, the vessel being shown arranged in a concrete primary shield annulus with the reactor core, internals, and primary system water being removed from the vessel and the refueling water remaining at a maximum level within the vessel;

FIG. 2 is an enlarged sectional elevation view of the vessel of FIG. 1 with the annealing apparatus embodying the present invention shown positioned within the vessel and ready for performing an annealing operation on the wall of the vessel, the refueling water having been pumped out of the vessel into the refueling canal immediately above the vessel;

FIG. 3 is a transverse sectional view through the vessel and annealing apparatus looking along the line III—III of FIG. 2;

FIG. 4 is an exploded fragmentary view of the upper region of the annealing apparatus showing details of construction of the inflatable seal arranged between the edge of the support plate and the wall of the vessel;

FIG. 5 is an enlarged elevation view of one temperature sensor assembly forming part of the present invention; and FIGS. 6a and 6b show a schematic control circuiting for regulating the power input to the heater rods forming a part of the present invention.

Referring now to the drawings, there is shown in FIG. 1 an elongated, generally cylindrically shaped nuclear reactor vessel 10 of a familiar and well-known design for use in a pressurized water-moderated nuclear reactor system. The vessel 10 has the usual hemispherical bottom and a plurality of inlet and outlet primary system water nozzles 12. Vessel 10 is shown arranged in a concrete primary shield annulus 14 having the usual passageways 16 communicating with the water nozzles 12, and an enlarged cavity or refueling canal 18 being formed in the bed 14 above the vessel, with the upper flange 20 of the vessel being in a plane generally coextensive with the plane of the bottom of the refueling canal 18. The vessel 10 is shown in FIG. 1 with the closure head and the reactor internals, core, and primary system water removed. The refueling water 22 is at maximum level within the vessel. Thus the vessel 10 as shown is under a refueling condition and ready for in-service annealing.

FIG. 2 shows an annealing apparatus 30 embodying the present invention and arranged within vessel 10 ready for performing an annealing operation on the section of the vessel wall which would be immediately adjacent the reactor core during operation of the reactor. The annealing apparatus 30 is removable from the vessel 10 and includes a support plate 32 sized to loosely fit in the upper region of the vessel and preferably in the space above the inner ledge 33 formed below the flange 20. An inflatable seal ring 34 is secured to the radial edge of the plate 32 and serves to form a water-tight seal between the inner confines of the vessel 10 and the cavity 18. A flexible tubing 36 connected with a source of pressurized air and a vacuum source, both of which sources are not shown, is secured to plate 32 and communicate with a passageway 38 formed in plate 32 which passageway communicates with the interior of the seal ring 34. Thus, with the plate 32 in position within the vessel 10 the seal ring 34 may be inflated by directing air through tubing 36, and when it is desired the seal ring may be collapsed, as when the annealing apparatus 30 is being removed from the vessel 10, by activating the vacuum source attached with tubing 36.

A pneumatically operated double acting pump 40 is supported by plate 32 for use in pumping the refueling water 22 out of the vessel 10 and into storage in refueling canal 18. The suction part of the pump 40 is connected with a pipe 42 sized to extend to a position closely adjacent to the bottom-most point of vessel 10. The discharge port of the pump 40 is open to the refueling canal 18. Air supply and exhaust lines 44 and 46, respectively are connected with the pump 40 and extend to a position above the refueling canal 18. The air supply line 44 is connected with a source of pressurized air, not shown.

A cylindrical shell 50 is secured to the lower surface of the plate 32 and is sized to extend downwardly to a position below the nozzles 12. An electrically conductive annular ring 52 is detachably secured as by nuts and bolts to the lower end of the shell 50 with a ring of electrical insulation 54 being disposed between the outer edge of the ring 52 and the shell 50. In other words, the ring 52 is secured to the shell 50 but is electrically insulated from it.

A plurality of circumferentially spaced elongated resistance heating rods 60 are directly connected in a generally cylindrical pattern to the lower surface of ring 52. The heating rods 60 are sized to be disposed in the vessel in a heat transfer relationship with the section of the vessel wall which would be immediately adjacent to the installed reactor core and thus be most subjected to the neutron bombardment from the reactor core and resulting reduced fracture toughness caused thereby. The lower ends of the heating rods 60 are secured to an electrically conductive ring 62. Electrical leads 63 connected to a source of electricity, not shown, extend through a conduit 64 supported by support plate 32 and are connected to both rings 52 and 62 to supply the necessary electrical energy to the heater rods 60. A suitable seal 65 is arranged between conduit 64 and support plate 32.

Four elongated brackets 70 spaced approximately 90 degrees apart are detachably secured to the upper ring 52 while being separated therefrom by a ring of electrical insulation 72. The brackets 70 extend downwardly to a point around midway of the heating rods 60. Temperature sensor assemblies 74 are secured to the lower end portions of the brackets 70. As is clearly shown in FIG. 5, each temperature sensor assembly 74 includes an air cylinder 75 which houses a normally inwardly biased piston 79 and a sensing element such as a thermocouple 76 secured to the free end of the piston. Tubing 77 connected with a source of air, not shown, and extending through conduit 64 is fixed to the piston end of each cylinder 75. Leads 78 fixed to the thermocouples 76 are wrapped in a spiral pattern around the air tubing 77 and extend out of conduit 64 to be connected with indicator instrumentation or a control circuit for controlling the electrical input to the heater rods 60. The thermocouples 76 would be normally retracted away from the wall of the vessel 10 during emplacement or removal of the annealing apparatus 30 in and out of the vessel 10. With the annealing apparatus in position, air may be directed to the air cylinders 75 to displace the pistons such that the thermocouples will engage the wall of vessel 10 to sense the temperature of the wall during the annealing operation.

A body of porous reflective heat insulation 80 is secured to the lower surface of support plate 32. The insulation 80 would preferably be stainless steel which would not be adversely affected by the annealing temperature which would be around 750° F. in the case of a vessel formed of SA533 or SA508 steel.

Lugs 82 are secured to the radial outer region of the upper surface of support plate 32 so that sling lines 84 may be attached thereto for use in lowering or raising the annealing apparatus 30. Also, guide brackets 86 are secured to the upper surface of the support plate 32, which guide brackets have outer portions sized to slidably engage elongated upwardly extending guide studs 88 arranged in the bolt holes of flange 20. Thus, the guide studs 88 and brackets 86 serve to guide the annealing apparatus 30 into and out of the vessel 10.

A tubular standpipe 89 is fixed to the support plate 32 and extends therethrough to communicate with the inner confines of the vessel 10 through the porous layer of insulation 80. The standpipe 89 extends to a position above refueling canal 18 to thereby serve as a means for effecting or providing a generally atmospheric pressure condition within the vessel 10 during operation of the annealing apparatus 30. A suitable seal 91 is disposed between standpipe 89 and support plate 32.

After the closure head, reactor internals, and reactor fuel core are removed from vessel 10, the annealing apparatus 30 is lowered into the vessel with the apparatus being guided into position by means of the guide studs 88 and brackets 86. When the annealing apparatus 30 is in place the seal ring 34 is inflated to effect a water-tight seal between the inner confines of the vessel 10 and the refueling canal 18. The refueling water 22 is then pumped out of the vessel 10 into refueling canal 18. The heater rods 60 are energized and cycled on and off to achieve the desired annealing temperature on the wall of the vessel for the required period of time. The cycling of the heater rods 60 may be either automatically or manually controlled by observing the temperature of the vessel wall as sensed by the thermocouples 76. FIG. 6a and 6b shows a simple schematic control circuit for controlling the power input to a bank of three of the heater rods 60. The thermocouples 76 are suitably connected to a thermostat control 100 which is coupled to switches 102 in a control circuit 104 suitably connected to a source of electricity 106. The circuit 104 includes a master switch 108 which is closed during operation of the annealing apparatus 30, and a relay coil 110 containing contacts 112 arranged in a three phase circuit as shown in FIG. 6a. When temperature of the wall of vessel 10 drops below the desired annealing temperatures the thermostat control 100 will receive a signal from the thermocouple circuit and the switches 102 will be closed to activate relay coil 110 to close contacts 112. As a result of the closing of contacts 112, the bank of three heater rods 60 will be supplied the needed power to heat the wall of vessel 10. When the temperature of the wall reaches the desired annealing temperature the switches 102 will be opened to thereby shut off the power supply to the heating rods 60. After the annealing cycle is completed the vessel 10 is permitted to cool to ambient temperature at which time the refueling water 22 is returned to the vessel 10. The annealing apparatus 30 is removed from the vessel at which time the reactor internals. reactor fuel core, and closure head may be reinstalled in the vessel 10.

It would be expected that the heat load on the primary shield bed 14 would be higher during the annealing cycle than during normal operation of the reactor. The increased heat load could be compensated for by using auxiliary air blowers to supplement the shield bed ventilation system during the annealing cycle.

It should now be appreciated how the annealing apparatus 30 of this invention fulfills the requirements specified in the introductory portion of this specification for use in in-service annealing of nuclear reactor vessels. As those skilled in this art would readily recognize the annealing temperature and time of the annealing cycle would be determined by such factors as the type of material used in constructing the vessel and the condition of the material of the vessel wall prior to annealing. For example, if the vessel were made of SA533 or SA508 steel, an annealing temperature of approximately 750° F. maximum for a period of 168 hours would be used to partially restore the beginning of life ductibility of the vessel steel.

While we have shown and described a present preferred embodiment of this invention it is to be distinctly understood that the invention is not limited thereto but may be otherwise variously embodied within the scope of the following claims.

What is claimed is:

1. An annealing apparatus for use with an operational nuclear reactor vessel arranged in a primary shield bed, with the reactor internals and core removed and primary system water remaining in the vessel, said annealing apparatus comprising:
   support means sized to be snugly received and fixedly supported in the upper section of the reactor vessel;
   heating means supported by said support means and arranged to be disposed in the vessel in a heat transfer relationship with the section of the vessel immediately adjacent to reactor core for selectively and controllably supplying annealing heat energy to said section of the vessel; and
   pump means supported on said support means for pumping the water out of the vessel to a reservoir after the annealing apparatus is placed in position within the vessel.

2. The annealing apparatus as set forth in claim 1 including means supported by said support means for effecting generally atmospheric pressure conditions within the vessel during operation of the annealing apparatus.

3. The annealing apparatus as set forth in claim 1 including reflective heat insulation means secured to the lower surface of said support means.

4. The annealing apparatus as set forth in claim 1 including extendible and retractible temperature sensing means supported by said support means and arranged at an intermediate longitudinal position with respect to said heating means and constructed and arranged such that the sensing elements may be retracted when the annealing apparatus is being placed within or removed from the vessel and may be extended to engage the wall of the vessel when the annealing apparatus is in place.

5. The annealing apparatus as set forth in claim 1 including guide means arranged between the vessel and said support means for guiding the support means into and out of the vessel.

6. The annealing apparatus as set forth in claim 1 including sealing means between said support means and said vessel for providing a water-tight seal between the inner confines of the vessel and the space above the vessel when the annealing apparatus is placed in position within the vessel.

7. An annealing apparatus for use with an elongated, operational nuclear reactor vessel arranged in a primary shield bed, with the reactor internals and core removed and primary system water remaining in the vessel, said annealing apparatus comprising:
   support plate means shaped to be received in the upper section of the reactor vessel with the size of the plate means being such that its outer edge would be adjacent the inner surface of the vessel when the annealing apparatus is placed in position within the vessel;
   elongated heater element means supported by said plate means and extending downwardly therefrom with the element means being arranged in a pattern and at a position to be disposed in the vessel to conform generally to the configuration of and to be disposed in heat transfer relationship to the section of the vessel immediately adjacent to the reactor core, said element means being for selectively and controllably supplying annealing heat energy to said section of the vessel;
   seal means on the edge of said support means for providing a seal between the inner confines of the vessel and the space above the vessel when the annealing apparatus is placed in position within the vessel;
   pump means supported on the upper surface of said plate means for pumping the water out of the vessel after the annealing apparatus is placed in position in the vessel;

heat insulation means secured to the lower surface of said plate means;

temperature sensing means supported by said plate means for engaging said section of the vessel during annealing thereof; and means supported by said plate means for effecting generally atmospheric pressure conditions within the vessel during operation of the annealing apparatus.

8. The annealing apparatus as set forth in claim 7 wherein said heat insulation means is a reflective heat insulator.

9. The annealing apparatus as set forth in claim 7 wherein said seal means comprises an inflatable seal ring and selectively operable air pressure means connected therewith, said seal ring being normally in a collapsed configuration such that said plate means may be freely placed in or removed from the vessel.

10. The annealing apparatus as set forth in claim 7 wherein said heating means include an array of elongated electrical resistance heaters.

11. The annealing apparatus as set forth in claim 7 wherein said temperature sensing means includes retractible and extendible means with sensing elements on the ends of such retractible and extendible means, and constructed and arranged such that the sensing elements may be retracted when the annealing apparatus is being placed within or removed from the vessel and may be extended to engage the wall of the vessel when the annealing vessel is in place.

12. The annealing apparatus as set forth in claim 7 including guide means arranged between the vessel and said plate means for guiding the plate means into and out of the vessel.

References Cited

UNITED STATES PATENTS

| 2,522,652 | 9/1950  | Von Haase     | 222—146 HE |
| 2,624,491 | 1/1953  | Bills et al.  | 222—146 H  |
| 2,918,562 | 12/1959 | Coceano       | 219—50     |
| 3,148,272 | 9/1964  | Aitken et al. | 219—523    |
| 2,827,542 | 3/1958  | Fellows et al.| 219—50     |

OTHER REFERENCES

Nuclear Science Abstracts, vol. 19, August 1965, No. 29615, Feasibility Study for In-Place Annealing of the PM—A Reactor Vessel (Alco Prod.), June 29, 1962.

REUBEN EPSTEIN, Primary Examiner

U.S. Cl. X.R.

219—50, 437